United States Patent
Hartmann et al.

(10) Patent No.: US 11,283,074 B2
(45) Date of Patent: Mar. 22, 2022

(54) ELECTRODE ACTIVE MATERIAL, ITS MANUFACTURE AND USE

(71) Applicants: BASF SE, Ludwigshafen am Rhein (DE); Karlsruher Institut fuer Technologie, Karlsruhe (DE)

(72) Inventors: Pascal Hartmann, Ludwigshafen (DE); Thomas Michael Ryll, Ludwigshafen (DE); Christoph Erk, Ludwigshafen (DE); Lea De Biasi, Karlsruhe (DE)

(73) Assignees: BASF SE, Ludwigshafen (DE); Karlsruher Institut für Technologie, Karlsruhe (DE)

( * ) Notice: Subject to any disclaimer, the term of this patent is extended or adjusted under 35 U.S.C. 154(b) by 0 days.

(21) Appl. No.: 16/652,188

(22) PCT Filed: Sep. 18, 2018

(86) PCT No.: PCT/EP2018/075143
§ 371 (c)(1),
(2) Date: Mar. 30, 2020

(87) PCT Pub. No.: WO2019/068454
PCT Pub. Date: Apr. 11, 2019

(65) Prior Publication Data
US 2020/0303735 A1    Sep. 24, 2020

(30) Foreign Application Priority Data

Oct. 6, 2017  (EP) ..................................... 17195157
Mar. 29, 2018  (EP) ..................................... 18164986

(51) Int. Cl.
| | |
|---|---|
| *H01M 4/525* | (2010.01) |
| *H01M 4/505* | (2010.01) |
| *C01G 53/00* | (2006.01) |
| *H01M 4/62* | (2006.01) |
| *C09J 7/29* | (2018.01) |
| *C09J 7/40* | (2018.01) |
| *C09J 121/00* | (2006.01) |
| *C09J 133/08* | (2006.01) |

(52) U.S. Cl.
CPC ............ *H01M 4/525* (2013.01); *C01G 53/50* (2013.01); *C09J 7/29* (2018.01); *C09J 7/403* (2018.01); *C09J 121/00* (2013.01); *C09J 133/08* (2013.01); *H01M 4/505* (2013.01); *H01M 4/623* (2013.01); *H01M 4/625* (2013.01); *C01P 2004/61* (2013.01); *C01P 2006/40* (2013.01)

(58) Field of Classification Search
CPC .................................. H01M 4/525; B22F 9/22
USPC .......................................... 252/182.1, 519.15
See application file for complete search history.

(56) References Cited

U.S. PATENT DOCUMENTS

| | | | |
|---|---|---|---|
| 2009/0050859 A1* | 2/2009 | Liu ................... | C04B 35/62805 252/520.2 |
| 2012/0248388 A1* | 10/2012 | Nagai .................. | H01M 4/525 252/519.15 |
| 2013/0108921 A1* | 5/2013 | Kase ..................... | C01G 53/50 429/211 |
| 2014/0326918 A1* | 11/2014 | Chen ........................ | B22F 9/22 252/182.1 |
| 2016/0006023 A1* | 1/2016 | Krkljus ................. | H01M 4/525 429/221 |

FOREIGN PATENT DOCUMENTS

| | | | | | |
|---|---|---|---|---|---|
| CN | 103708567 | A * | 4/2014 | ............ | H01M 4/525 |
| EP | 3093272 | A1 * | 11/2016 | ............ | H01M 4/525 |

* cited by examiner

*Primary Examiner* — Khanh T Nguyen
(74) *Attorney, Agent, or Firm* — Finnegan, Henderson, Farabow, Garrett & Dunner LLP

(57) ABSTRACT

The present invention is related to an electrode active material for a lithium-ion battery of general formula (I): $Li_{1+x}(Ni_aCo_bMn_cM_d)_{1-x}O_2$ wherein x is in the range of from zero to 0.1, a is in the range of from 0.1 to 0.5, b is in the range of from 0.4 to 0.9, c is in the range of from zero to 0.3, d is in the range of from zero to 0.1, M is selected from Al, B, Mg, W, Mo, Ti, Si and Zr, with a+b+c+d=1 and a>c. In addition, the present invention is related to a method of manufacture of electrode active materials and to their use.

6 Claims, No Drawings

ELECTRODE ACTIVE MATERIAL, ITS MANUFACTURE AND USE

The present invention is related to an electrode active material for a lithium-ion battery of general formula (I)

$$Li_{1+x}(Ni_aCo_bMn_cM_d)_{1-x}O_2 \qquad (I)$$

wherein
x is in the range of from zero to 0.1,
a is in the range of from 0.1 to 0.5,
b is in the range of from 0.4 to 0.9,
c is in the range of from zero to 0.3,
d is in the range of from zero to 0.1,
M is selected from Al, B, Mg, W, Mo, Ti, Si and Zr,
with a+b+c+d=1 and a>c.

In addition, the present invention is related to a method of manufacture of electrode active materials and to their use.

Lithiated transition metal oxides are currently being used as electrode active materials for lithium-ion batteries. Extensive research and developmental work has been performed in the past years to improve properties like charge density, specific energy, but also other properties like the reduced cycle life and capacity loss that may adversely affect the lifetime or applicability of a lithium-ion battery. Additional effort has been spent to improve manufacturing methods.

In a typical process for making electrode active materials for lithium-ion batteries, first a so-called precursor is formed by co-precipitating the transition metals as carbonates, oxides or preferably as hydroxides that may or may not be basic. The precursor is then mixed with a lithium salt such as, but not limited to LiOH, $Li_2O$ or—especially—$Li_2CO_3$— and calcined (fired) at high temperatures. Lithium salt(s) can be employed as hydrate(s) or in dehydrated form. The calcination—or firing—generally also referred to as thermal treatment or heat treatment of the precursor—is usually carried out at temperatures in the range of from 600 to 1,000° C. During the thermal treatment a solid state reaction takes place, and the electrode active material is formed. In cases hydroxides or carbonates are used as precursors the solid state reaction follows a removal of water or carbon dioxide. The thermal treatment is performed in the heating zone of an oven or kiln.

Many electrode active materials discussed today are of the type of lithiated nickel-cobalt-manganese oxide ("NCM materials"). Many NCM materials used in lithium-ion batteries have an excess of lithium compared to the transition metal, see, e.g., U.S. Pat. No. 6,677,082.

US 2010/068376 discloses certain Co-coated Mn/Ni hydroxides and cathode active materials made therefrom.

In EP 1 447 866 A1, Co-rich cathode active materials for lithium ion batteries are disclosed. In CN 103 708 567 A1, certain cathode active materials with equal amounts of manganese and nickel are disclosed.

It has been found, though, that lifetime of many lithium-ion batteries is limited. Specifically, the capacity loss after repeated cycles reduces the attractiveness of lithium-ion batteries for many applications such as, but not limited to automotive applications. Generally, the electrode active materials and in particular the cathode active materials have been assigned a key role for the lifetime of a lithium-ion battery. The improvement of capacity loss upon repeated cycling—charging and discharging—is also referred to as cyclability.

It was therefore an objective of the present invention to improve the lifetime of a lithium-ion battery. It was specifically an objective of the present invention to provide an electrode active material with good cyclability that allows manufacture of lithium-ion batteries with improved lifetime. It was further an objective of the present invention to provide a method of manufacture of electrode active materials that allow the manufacture of lithium-ion batteries with improved lifetime.

Accordingly, the electrode active materials defined at the outset have been found, hereinafter also referred to as inventive electrode active materials or as electrode active materials according to the (present) invention. It has been found that inventive active material materials preferably display a small change in volume upon charging and discharging. Without wishing to be bound by any theory it is believed that a bigger change in volume of the electrode active material, measured for example as change in crystallographic unit cell volume defined by unit cell axes dimensions a, b, and c and inclination angles of the axes in the unit cell α, β, and γ—in the course of charging and discharging may lead to mechanical stress in electrodes and thus contribute to a reduced cyclability.

Inventive electrode active materials contain cobalt and manganese, and inventive electrode active materials have the general formula (I)

$$Li_{1+x}(Ni_aCo_bMn_cM_d)_{1-x}O_2 \qquad (I)$$

wherein
x is in the range of from zero to 0.1, preferably up to 0.05,
a is in the range of from 0.1 to 0.5, preferably from 0.1 to 0.3,
b is in the range of from 0.4 to 0.9, preferably from 0.5 to 0.8,
c is in the range of from zero to 0.3, preferably from zero to 0.15,
d is in the range of from zero to 0.1, preferably zero to 0.03, more preferably d<0.05 and even more preferably d=zero,
M is selected from Al, B, Mg, W, Mo, Ti, Si and Zr, preferred are Al, B, Mg, W, Ti, Si and Zr
with a+b+c+d=1 and a>c.

In another preferred embodiment of the present invention, c+d>zero. Even more preferred, 0.01<c+d<0.15.

In one embodiment of the present invention, Co and Ni are homogeneously distributed over the particle diameter of inventive electrode active materials. The distribution may be determined by SEM/EDX or TEM/EDX.

In one embodiment of the present invention, inventive electrode active materials may be coated with an oxide, for example alumina, zirconia, titanium dioxide, or $LiCoO_2$. In other embodiments, inventive electrode active materials are not coated.

Many elements are ubiquitous. For example, sodium and iron are detectable in certain very small proportions in virtually all inorganic materials. In the context of the present invention, proportions of less than 0.05 mol-% of the cations of the respective inventive electrode active material are disregarded.

In one embodiment of the present invention, the mean secondary particle diameter (D50) of inventive electrode active materials is in the range of from 2 to 20 μm, preferably 5 to 20 μm and even more preferred 7 to 15 μm. The mean particle diameter (D50) in the context of the present invention refers to the median of the volume-based particle diameter, as can be determined, for example, by light scattering.

In most embodiments, particles of inventive electrode active materials are composed of primary particles that are agglomerated to form secondary particles. In one embodiment of the present invention, such primary particles have an average diameter (D50) in the range of from 50 nm to 500 nm, for example determined by XRD or scanning electron microscopy (SEM).

In one embodiment of the present invention, the crystallographic unit cell volume of partially delithiated material according to general formula (II)

$(Li_{1+x})_y(Ni_aCo_bMn_cM_d)_{1-x}O_2$ (I)

with y fulfilling the condition that y·(1+x) is in the range of from 0.35 to 1, is at most 1% smaller than the volume of the crystallographic unit cell of the respective fully lithiated material. The value of y refers to the degree of delithiation. The volumes of crystallographic unit cells may be determined by X-ray diffraction ("XRD"). In the respective fully lithiated material, y=1.

In one embodiment of the present invention, inventive electrode active materials contain in the range of from 0.01 to 1% by weight $Li_2CO_3$, determined as $Li_2CO_3$ and referring to said inventive electrode active material. The carbonate content can preferably be determined by slurrying the respective lithiated transition metal oxide in distilled water followed by filtration and subsequent titration of the filtrate with 0.1 M aqueous HCl, or, as an alternative, by determination of the inorganic carbon with IR spectroscopy.

In one embodiment of the present invention, inventive electrode active materials contain, as an impurity, at least one lithium compound selected from lithium hydroxide, lithium oxide and lithium carbonate and from combinations of at least two thereof, for example a combination of $Li_2O$ and LiOH or a combination of LiOH and $Li_2CO_3$ or a combination of $Li_2O$ and $Li_2CO_3$ or a combination of LiOH and $Li_2O$ and $Li_2CO_3$. The term impurity in the context of the lithium compound selected from lithium hydroxide, lithium oxide and lithium carbonate and combinations of at least two thereof implies that such lithium compound stems from a starting material or an impurity in at least one starting material or has been formed as a side reaction during the synthesis of the respective lithiated transition metal oxide. Carbonate ions are usually combined with lithium cations for calculation purposes. Therefore, in the course of the current invention, $Li_2CO_3$ is not necessarily contained as crystals of $Li_2CO_3$ but may as well be a calculated value. Also, the amount of $Li_2O$ or LiOH may be calculated as $Li_2CO_3$. Such impurity lithium compound selected from lithium hydroxide, lithium oxide and lithium carbonate and from combinations of at least two thereof may—in the context of the present invention—also be referred to as "$Li_2CO_3$ impurity".

In one embodiment of the present invention, the specific surface area (BET, hereinafter also referred to as "BET-surface") of inventive electrode active materials is in the range of from 0.1 to 10 m²/g, preferably from 0.2 to 1 m²/g. The BET-surface can be determined by nitrogen absorption, for example according to DIN 66131.

In one embodiment of the present invention, inventive electrode active materials are in the form of agglomerated primary particles of inventive electrode active material. Such agglomerates are then referred to as secondary particles of inventive electrode active materials.

In one embodiment of the present invention, primary particles of inventive electrode active materials have an average diameter in the range from 1 to 10,000 nm, preferably from 10 to 1,000 nm, particularly preferably from 50 to 500 nm. The average primary particle diameter can, for example, be determined by SEM or TEM, or by LASER scattering technologies, for example at a pressure in the range of from 0.5 to 3 bar.

Inventive electrode materials may be applied in a coated or non-coated version. It is possible, for example, to coat inventive electrode active material with an oxide, for example with $Al_2O_3$.

A further aspect of the present invention refers to electrodes comprising at least one inventive electrode active materials. They are particularly useful for lithium-ion batteries. Lithium-ion batteries comprising at least one inventive electrode exhibit a very good charge/discharge and cycling behavior. Preferably, also the cycle stability and the C-rate capacity behavior are improved. Electrodes comprising at least one electrode active material according to the present invention are hereinafter also referred to as inventive electrodes or electrodes according to the present invention, or as inventive cathodes.

In one embodiment of the present invention, inventive electrodes are in the form of thin-film electrodes. Thin-film electrodes comprise inventive electrode active material. Physical or chemical vapor deposition techniques may be used to produce the thin films. The electrode films have a thickness in the range from 10-10,000 nm, preferably from 100 to 5,000 nm.

In one embodiment of the present invention, inventive electrodes contain a current collector and
(A) at least one inventive electrode active materials, as described above,
(B) carbon in an electrically conductive state,
(C) a binder, and
(D) optionally, a solid electrolyte.

In one embodiment of the present invention, inventive electrodes contain a current collector and
(A) 50 to 100 wt.-% of inventive electrode active material,
(B) zero to 5 wt.-% of carbon in electrically conductive form,
(C) zero to 5 wt.-% of binder, and,
(D) optionally, a solid electrolyte,
percentages referring to the sum of (A)+(B)+(C)+(D).

Components (A), (B), (C), and (D) are explained in more detail below. Electrodes according to the present invention can comprise further components. They comprise a current collector, such as, but not limited to, an aluminum foil.

Electrodes according to the present invention further contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

In one embodiment of the present invention, the ratio of carbon (B) to inventive electrode material is in the range of 1 to 15% by weight, referring to total inventive electrode, preferably at least 2% by weight.

Inventive electrodes may further comprise a binder (C).

Suitable binders (C) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride, and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene, and α-methylstyrene.

Another preferred binder (C) is polybutadiene.

Other suitable binders (C) are selected from polyethylene oxide (PEO), cellulose, carboxymethylcellulose, polyimides, and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers, and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise zero to 5% by weight of binder(s) (C), referring to the sum of electrode material (A), carbon (B) and binder (C).

Solid electrolytes (D) are lithium ion conductive materials that are solid at temperatures of at least 30° C., preferably at least 50° C. Examples of solid electrolytes (D) are preferably lithium ion conductive materials such as lithium ion conductive ceramics, sintered ceramics, glass-ceramics, glasses, and polymer compounds. Preferred solid electrolytes (D) exhibit a conductivity for lithium ions of higher than $10^{-7}$ S/cm at 25° C., preferably in the range of $1\cdot10^{-6}$ S/cm-$5\cdot10^{-2}$ S/cm at 25° C. In particular, ceramic materials with perovskite, Nasicon, Thio-Lisicon, argyrodite or garnet related crystal structure offer good conductivities, but inorganic phosphorous and sulfur containing materials are suitable. Polymer based electrolytes contain at least one polymer from the list: polyethers, polyesters, polyimides, polyketones, polycarbonates, polyamides, poly-sulfides, polysulfones, polyurethanes, polyacrylates, polyolefines, styrenic polymers, vinyl polymers, fluoropolymers, polyphosphazenes, polysiloxanes, polysilazanes, boron polymers, liquid crystal polymers (LCP), polyacetylenes, polyanilines, polyfuranes, polyphenylenes, polypyrroles, polythiophenes or blends of at least two of the aforementioned polymers.

A further aspect of the present invention is an electrochemical cell, containing
(a) at least one inventive electrode,
(b) at least one anode, and
(c) at least one electrolyte.

Embodiments of cathode (a) have been described above in detail.

Anode (b) may contain at least one anode active material, such as carbon (graphite), lithium metal, $TiO_2$, lithium titanium oxide, silicon or tin. Anode (b) may additionally contain a current collector, for example a metal foil such as a copper foil.

Electrolyte (c) may comprise at least one non-aqueous solvent, at least one electrolyte salt and, optionally, additives.

Non-aqueous solvents for electrolyte (c) can be liquid or solid at room temperature and are preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane, and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate, and diethyl carbonate.

Examples of suitable cyclic organic carbonates are compounds of the general formulae (III.1) and (III.2)

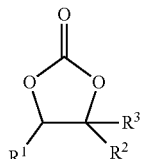

(III.1)

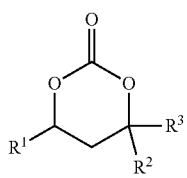

(III.2)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

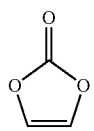

(IV)

The solvent or solvents is/are preferably used in the water-free state, i.e. with a water content in the range from 1 ppm to 0.1% by weight, which can be determined, for example, by Karl-Fischer titration.

Electrolyte (c) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAcl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators (d) by means of which the electrodes are mechanically separated. Suitable separators (d) are polymer films, in particular porous polymer films, which are unreactive toward metallic lithium. Particularly suitable materials for separators (d) are polyolefins, in particular film-forming porous polyethylene and film-forming porous polypropylene.

Separators (d) composed of polyolefin, in particular polyethylene or polypropylene, can have a porosity in the range of from 35 to 45%. Suitable pore diameters are, for example, in the range of from 30 to 500 nm.

In another embodiment of the present invention, separators (D) can be selected from among PET nonwovens filled with inorganic particles. Such separators can have a porosity in the range from 40 to 55%. Suitable pore diameters are, for example, in the range from 80 to 750 nm.

Electrochemical cells according to the invention can further comprise a housing which can have any shape, for example cuboidal or the shape of a cylindrical disk. In one variant, a metal foil configured as a pouch is used as housing.

Electrochemical cells according to the invention provide a very good charge/discharge and cycling behavior, in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention further refers to a process for making inventive electrode active materials, hereinafter also referred to as inventive manufacturing process. The inventive manufacturing process comprises the following steps, hereinafter also referred to as step (a), step (b) and step (c), respectively:

(a) manufacturing a particulate precursor by co-precipitation of hydroxides or carbonates of Ni, Co and, optionally, Mn and, optionally, M, (b) mixing the particulate precursor with a source of lithium, (c) calcining the mixture obtained in step (b).

Steps (a) to (c) of the inventive process are being performed in the order step (a), step (b), and step (c). They may be performed consecutively without substantial intermediate steps, or they may be performed with one or more intermediate steps. Embodiments of the inventive process are explained in more detail below.

In step (a) of the inventive process, a solution containing water-soluble salts of nickel, cobalt and, optionally, manganese, and, optionally, M is contacted with a base, for example a solution of alkali metal hydroxide or alkali metal (hydrogen)carbonate. An example of alkali metal hydroxides is potassium hydroxide and preferred is sodium hydroxide. Examples of alkali metal (hydrogen)carbonate are sodium carbonate, sodium bicarbonate, potassium carbonate, and potassium bicarbonate.

Said contacting can be performed by simultaneously feeding a said base and one or more solutions of water-soluble salts of nickel, cobalt and, optionally, manganese into a vessel, preferably under stirring. It is preferred to perform such contacting by feeding a solution of alkali metal hydroxide and a solution containing water-soluble salts of each cobalt, nickel and manganese, in the molar ratio of said material of general formula (I). A salt of M, if applicable, may be added to said vessel as well. It is well possible, though, to add M to the precursor at a later stage.

Water-soluble in the context of the present invention shall mean that such salt has a solubility of at least 20 g/l in distilled water at 20° C., the amount of salt being determined under omission of crystal water and of water stemming from aquo complexes. Water-soluble salts of nickel, cobalt and manganese may preferably be the respective water-soluble salts of $Ni^{2+}$, $Co^{2+}$, and $Mn^{2+}$.

In one embodiment of the present invention, the step (a) of the inventive process is performed at temperatures in the range from 10 to 85° C., preferably at temperatures in the range from 20 to 60° C.

In one embodiment of the present invention, step (a) of the inventive process is performed at a pH value in the range from 8 to 13, preferably 11 to 12.5, more preferably 11.5 to 12.2, each measured in the mother liquor at 23° C.

In one embodiment of the present invention, the inventive process is performed at a pressure in the range from 500 mbar to 20 bar, preferably standard pressure.

In one embodiment of the present invention, an excess of base is used, for example alkali metal hydroxide, based on transition metal. The molar excess may, for example, be in the range from 1.1:1 to 100:1. It is preferable to work with a stoichiometric proportion of precipitant.

In one embodiment of the present invention, aqueous solution of alkali metal hydroxide has a concentration of alkali metal hydroxide in the range from 1 to 50% by weight, preferably 10 to 25% by weight.

In one embodiment of the present invention, the concentrations of aqueous solution of nickel, cobalt, and—if applicable—manganese salts can be selected within wide ranges. Preferably, the concentrations are selected such that they are within the range of, in total, 1 to 1.8 mol of the transition metals/kg of solution, more preferably 1.5 to 1.7 mol of the transition metals/kg of solution. "The transition metal salts" used herein refers to the water-soluble salts of nickel, cobalt and manganese.

In one embodiment of the present invention, step (a) of the inventive process is performed in the presence of at least one compound L which may serve as a ligand for at least one of the transition metals, for example in the presence of at least one organic amine or especially of ammonia. In the context of the present invention, water should not be regarded as a ligand.

In one embodiment of the present invention, a concentration of L, especially of ammonia, within the range from 0.05 to 1 mol/l, preferably 0.1 to 0.7 mol/l, is selected. Particular preference is given to amounts of ammonia for which the solubility of $Ni^{2+}$ in the mother liquor is not more than 1000 ppm, more preferably not more than 500 ppm.

In one embodiment of the present invention, mixing is effected during step (a) of the inventive process, for example with a stirrer. Preference is given to introducing a stirrer output of at least 1 W/l into the reaction mixture, preferably at least 3 W/l and more preferably at least 5 W/l. In one embodiment of the present invention, a stirrer output of not more than 25 W/l can be introduced into the reaction mixture.

In a specific embodiment of the present invention, the procedure may be, in the case of batch-wise process variants, to lower the stirrer output toward the end in batch-wise operations.

In one embodiment of the present invention, mother liquor is drawn off during carrying out step (a) of the inventive process.

Step (a) of the inventive process may be performed in the presence or absence of one or more reducing agents. Examples of suitable reducing agents are hydrazine, ascorbic acid, glucose, and alkali metal sulfites. It is preferable not to use any reducing agent in step (a).

Step (a) of the inventive process can be performed under air, under inert gas atmosphere, for example under noble gas or nitrogen atmosphere, or under reducing atmosphere. An example of a reducing gas is, for example, $SO_2$. Preference is given to working under inert gas atmosphere.

Step (a) of the inventive process furnishes a mixed hydroxide of nickel, cobalt, and manganese in the form of particles that are slurried in their mother liquor. Said particles may have an irregular or preferably a spherical shape. Spherical particles shall include not just those which are exactly spherical but also those particles in which the maximum and minimum diameter of at least 95% (number average) of a representative sample differ by not more than 5%.

In one embodiment of the present invention, step (a) has a duration of from 1 to 40 hours, preferably of 2 to 30 hours. In another embodiment of the present invention, step a is carried out continuously, and the average residence time is in the range of from 1 to 40 hours, preferably of 2 to 30 hours.

In alternative embodiments, the rates of addition of aqueous solution of water-soluble salts of nickel, cobalt and manganese on one hand and of solution of alkali metal hydroxide on the other hand are changed during step (a) of the inventive process, and/or the composition of the aqueous solution of water-soluble salts of nickel, cobalt and manganese is altered during step (a). In the latter embodiment, particles of mixed hydroxides may be obtained in which at least two of the transition metals exhibit a concentration gradient.

The precursor so obtained is preferably removed and then dried in the presence of oxygen. Removal of the precursor refers to removal of said particles from the respective mother liquor. The removal can be effected, for example, by filtration, centrifugation, decantation, spray drying or sedimentation, or by a combination of two or more of the aforementioned operations. Suitable apparatuses are, for example, filter presses, belt filters, spray dryers, hydrocyclones, inclined clarifiers or combinations of the aforementioned apparatuses.

Mother liquor refers to water, water-soluble salts and any further additives present in solution. Possible water-soluble salts are, for example, alkali metal salts of the counterions of the transition metals, for example sodium acetate, potassium acetate, sodium sulfate, potassium sulfate, sodium nitrate, potassium nitrate, sodium halide, especially sodium chloride, potassium halide, and also additional salts, any additives used, and any excess alkali metal hydroxide, and also ligand L. In addition, the mother liquor may comprise traces of soluble transition metal salts.

It is desirable to remove the particles as completely as possible.

After the actual removal, the precursor may be washed. Washing can be effected, for example, with pure water or with an aqueous solution of alkali metal carbonate or alkali metal hydroxide, especially with an aqueous solution of sodium carbonate, potassium carbonate, sodium hydroxide, potassium hydroxide or ammonia. Water and aqueous solution of alkali metal hydroxide, especially of sodium hydroxide, are preferred.

The washing can be effected, for example, with employment of elevated pressure or elevated temperature, for example 30 to 50° C. In another variant, the washing is performed at room temperature. The efficiency of the washing can be checked by analytical measures. For example, the content of transition metal(s) in the washing water can be analyzed.

If washing is effected with water rather than with an aqueous solution of alkali metal hydroxide, it is possible to check with the aid of conductivity studies on the washing water whether water-soluble substances, for example water-soluble salts, can still be washed out.

After removal, drying may be performed in the presence of oxygen. Presence of oxygen in this context refers to the presence of oxygen gas. Presence of oxygen therefore includes an atmosphere of air, of pure oxygen, of mixtures from oxygen with air, and of air diluted with an inert gas such as nitrogen.

The drying may be performed, for example, at a temperature in the range from 30 to 150° C. If the drying is performed with air, it is observed in many cases that some transition metals are partially oxidized, for example $Mn^{2+}$ to $Mn^{4+}$ and $Co^{2+}$ to $Co^{3+}$, and blackening of precursor is observed.

To perform step (b) of the inventive process, the procedure may be, for example, to mix precursor with at least one source of lithium, for example with at least one compound selected from $Li_2O$, LiOH, and $Li_2CO_3$, water of crystallization being neglected in the context of the present invention. Preferred source of lithium is $Li_2CO_3$.

To perform step (b) of the inventive process, the amounts of precursor and of lithium compound are selected so as to obtain the stoichiometry of the desired material of formula (I). Preferably, the amounts of precursor and lithium compound(s) are selected such that the molar ratio of lithium to the sum of all transition metals and any M is in the range of from 1:1 to 1.1:0.9, preferably 1.02:0.98 to 1.05:0.95.

A mixture is obtained in step (b).

To perform step (c) of the inventive process, the mixture of precursor and lithium compound(s) is then calcined, for example at a temperature in the range of from 700 to 950° C., preferably 800 to 950° C.

Step (c) of the inventive process can be performed in a furnace, for example in a rotary tube furnace, in a muffle furnace, in a pendulum furnace, in a roller hearth furnace or in a push-through furnace. Combinations of two or more of the aforementioned furnaces are possible as well.

Step (c) of the inventive process can be performed over a period of 30 minutes to 24 hours, preferably 3 to 12 hours. Step (e) can be effected at a temperature level, or a temperature profile can be run.

In one embodiment of the present invention, step (c) is performed in an oxygen-containing atmosphere. Oxygen-containing atmosphere includes an atmosphere of air, of pure oxygen, of mixtures from oxygen with air, and of air diluted with an inert gas such as nitrogen. In step (c), preferred is an atmosphere of oxygen or oxygen diluted with air or nitrogen and a minimum content of oxygen of 21 vol.-%.

In one embodiment of the present invention, between steps (b) and (c) at least one pre-calcining step (c*) is being performed. Step (c*) comprises heating the mixture obtained in step (d) at a temperature in the range of from 300 to 690° C. for a period of 2 to 24 hours, and performing step (c) with the material obtained in step(s) (c).

In one embodiment of the present invention, two pre-calcining steps are being performed between steps (b) and (c). Said two pre-calcining steps include heating the mixture obtained in step (b) at a temperature in the range of from 300 to 400° C. for a period of 2 to 12 hours, followed by heating the material so obtained at a temperature in the range of from 500 to 700° C. for a period of 2 to 12 hours.

During the temperature changes, a heating rate of 1 K/min up to 10 K/min can be applied, preferred is 2 to 5 K/min.

After step (c), an inventive electrode active material is obtained.

The present invention is further illustrated by working examples.

General: PVdF:Polyvinylidene Fluoride

ELY.1: 1 M $LiPF_6$ in a 1:1 (w/w) mixture of ethylene carbonate and dimethyl carbonate ELY.2: 1 M $LiPF_6$ in a 3:7 (w/w) mixture of ethylene carbonate and diethyl carbonate EXAMPLE 1: $Li_{1.03}(Ni_{0.3}Co_{0.6}Mn_{0.1})_{0.97}O_2$ Synthesis of Mixed Metal Hydroxide Precursor:

The mixed metal hydroxide precursor material was made by simultaneous feed of aqueous transition metal sulfate solution and an alkaline precipitation agent into a stirred tank reactor, at a flow rate ratio of 1.8, and a total flow rate resulting in a residence time of 12 hours. The transition metal sulfate solution contained Ni, Co, and Mn in a molar ratio of 3:6:1 and a total transition metal concentration of 1.65 mol/kg. The alkaline precipitation agent consisted of an aqueous 25 wt. % solution of sodium hydroxide and a 25 wt. % ammonia solution in a weight ratio of 8.5. The pH value was kept constant at 12.0 by additional feed of aqueous sodium hydroxide solution. The mixed metal hydroxide precursor was obtained by filtration of the continuously overflowing slurry from the reactor, washing with distilled water, drying at 120° C. in air over a period of 12 hours, and sieving.

Synthesis of Inventive Electrode Active Material CAM.1:

The mixed metal hydroxide precursor obtained according to the description above was mixed with $Li_2CO_3$ to obtain a molar ratio of Li/(Ni+Co+Mn)=1.03. The mixture was heated in a forced flow of air with the following heating profile: heating rate 3K/min, 4 hours at 350° C., 4 hours at 675° C., 6 hours at 900° C., natural cooling to ambient temperature. Inventive electrode active material CAM.1 was obtained.

Electrode Preparation:

Electrodes were prepared by slurry casting onto Al foil (20 μm, Nippon) using a KTF-S roll-to-roll coater (Mathis AG). Slurries were obtained by dispersing cathode material (94 wt.-%), Super C65 (1 wt.-%, Timcal) and SFG6L (2 wt.-%, Timcal) conductive carbon additives as well as Solef® 5130 PVdF binder (3 wt.-%, Solvay) in 1-ethyl-2-pyrrolidone (NEP).

Characterization:

Electrochemical characterization was conducted at 25° C. on coin-type half cells. The cells were assembled inside an Ar-filled glovebox (MBraun) by stacking cathode, glass microfiber separator (GF/D, GE Healthcare Life Sciences, Whatman), and lithium foil anode (Rockwood Lithium Inc.) of diameters 13, 17 and 13 mm, respectively, using 250 µL of either electrolyte ELY.1 or ELY.2. The areal loadings were approx. 2.0 mAh/cm$^2$ at C/10 and an upper cut-off voltage of 4.3 V.

For in situ XRD, pouch-type cells were assembled in a dry room by stacking cathode (20 mm×40 mm), Celgard 2500 polypropylene separator (30 mm×50 mm) and lithium foil anode (24 mm×44 mm) using 250 µL of ELY.1. Prior to XRD, the electrodes were galvanostatically cycled in the voltage range of 3.0 to 4.3 V for 3 cycles. Then, the cells were inserted into the diffractometer and charged/discharged at C/10 for 1 cycle during the measurement. Constant voltage steps at the cut-off voltages were applied for 1 h to allow for thermodynamic equilibration of the electrode materials. 2D diffraction images were collected in transmission geometry with an exposure time of 90 s. The intensity of two consecutive images was added up and then integrated to obtain 1D patterns for further evaluation, resulting in a time resolution of 180 s. Data analysis was performed by Rietveld refinement using the software TOPAS-Academic version 5. The instrumental resolution function was determined from an annealed $CeO_2$ sample and described by means of a (Thompson-Cox-Hastings) pseudo-Voigt profile function. The analysis comprised refinement of the lattice parameters a and c as well as the atomic coordinate z of the oxygen position. Broadening effects (apparent crystallite size, microstrain etc.) were accounted for by convolution-based profile fitting, as implemented in TOPAS. This approach is equivalent to the Double-Voigt method described by Balzar et al. and is based on the integral breadths of the diffraction lines. Background refinement was made using a 10-term Chebyshev polynomial function. Zero-point correction (by Norby) was used to correct for sample displacement errors of both the cathode material and Al current collector.

EXAMPLE 2 ($Li_{1.03}(Ni_{0.2}Co_{0.7}Mn_{0.1})_{0.97}O_2$)

Synthesis of Mixed Metal Hydroxide Precursor:

The mixed metal hydroxide precursor material was made by simultaneous feed of aqueous transition metal solution and an alkaline precipitation agent into a stirred tank reactor, at a flow rate ratio of 1.8, and a total flow rate resulting in a residence time of 12 hours. The transition metal solution contained Ni, Co, and Mn at a molar ratio of 2:7:1 and a total transition metal concentration of 1.65 mol/kg. The alkaline precipitation agent consisted of an aqueous 25 wt. % solution of sodium hydroxide and a 25 wt. % ammonia solution in a weight ratio of 8.5:1. The pH value was kept constant at 12.0 by an additional feed of aqueous sodium hydroxide solution. The mixed metal hydroxide precursor was obtained by filtration of the continuously overflowing suspension from the reactor, washing with distilled water, drying at 120° C. in air over a period of 12 hours and sieving.

Synthesis of Inventive Electrode Active Material CAM.2:

The mixed metal hydroxide precursor obtained according to the description above was mixed with $Li_2CO_3$ to obtain a molar ratio of Li/(Ni+Co+Mn)=1.03. The mixture was heated in a forced flow of ambient air with the following heating profile: heating rate 3 K/min, 4 hours at 350° C., 4 hours at 675° C., 6 hours at 900° C., natural cooling.

Inventive electrode active material CAM.2 was obtained. Electrodes were prepared and tested analogously to Example 1.

COMPARATIVE EXAMPLE 3 (NCM523)

Synthesis of Mixed Metal Hydroxide Precursor:

A mixed metal hydroxide precursor according to the description above, but with the following composition: $(Ni_{0.5}Co_{0.2}Mn_{0.3})(OH)_2$.

Synthesis of Lithiated Transition Metal Oxide:

The mixed metal hydroxide precursor was mixed with $Li_2CO_3$ to obtain a molar ratio of Li/(Ni+Co+Mn)=1.08. The mixture was heated in a forced flow of ambient air with the following heating profile: heating rate 2.5 K/min, 4.8 hours at 350° C., 6 hours at 650° C., 7.2 hours at 900° C., cooling with 1 K/min. C-CAM.3 was obtained.

Electrode Preparation

Electrodes were prepared analogously to Example 1, but with different slurry composition: Slurries were obtained by dispersing cathode material (93 wt.-%), Super C65 (1.5 wt.-%, Timcal) and SFG6L (2.5 wt.-%, Timcal) conductive carbon additives as well as Solef® 5130 PVDF binder (3 wt.-%, Solvay) in N-ethylpyrrolidone. Tests: See Example 1.

COMPARATIVE EXAMPLE 4 (NCM111)

Synthesis of Mixed Metal Hydroxide Precursor:

A mixed metal hydroxide precursor according to the description above but with the following composition: $(Ni_{0.33}Co_{0.33}Mn_{0.33})(OH)_2$.

Synthesis of Lithiated Transition Metal Oxide:

The mixed metal hydroxide precursor was mixed with $Li_2CO_3$ to obtain a molar ratio of Li/(Ni+Co+Mn)=1.08. The mixture was heated in a forced flow of ambient air with the following heating profile: heating rate 2.5 K/min, 4.8 hours at 350° C., 6 hours at 650° C., 7.2 hours at 900° C., cooling with 1 K/min. C-CAM.4 was obtained. Electrodes were prepared and tested analogously to Example 1.

The results are summarized in Table 1.

TABLE 1

Test results of inventive electrode active materials

| CAM.1 | | | CAM.2 | | |
|---|---|---|---|---|---|
| Voltage (V) vs. Li | Discharge capacity [mA/g] | Volume change [%] | Voltage (V) vs. Li | Discharge capacity [mA/g] | Volume change [%] |
| 4.4 | 176 | 0.10 | 4.4 | 173 | 0.50 |
| 4.5 | 190 | −0.35 | 4.5 | 188 | 0.01 |

| C-CAM.3 | | | C-CAM.4 | | |
|---|---|---|---|---|---|
| Voltage (V) vs. Li | Discharge capacity | Volume change [%] | Voltage (V) vs. Li | Discharge capacity | Volume change [%] |
| 4.4 | 176 | −2.20 | 4.4 | 165 | −1.0 |
| 4.5 | 186 | −2.80 | 4.5 | 177 | −1.6 |

The "volume change" given in the table refers to relative change in volume of the crystallographic unit cell when charging a cell with lithium anode and a cathode comprising the corresponding NCM material to a voltage of 4.4 V and 4.5 V, respectively. The "discharge capacity" is the specific discharge capacity for the corresponding material after charging the cell to the given voltage of 4.4 V and 4.5 V, respectively.

The value of y was in the range of from 0.35 to 1 at 4.5 V.

The invention claimed is:

1. An electrode active material of formula (I):

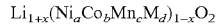 (I)

wherein x is in the range of from zero to 0.05,
a is in the range of from 0.1 to 0.3,
b is in the range of from 0.5 to 0.8,
c is in the range of from zero to 0.15,
d is in the range of from zero to below 0.05,
M is selected from the group consisting of Al, B, Mg, W, Mo, Ti, Si and Zr,
with a+b+c+d=1 and a>c and 0.01≤c+d≤0.15,
and wherein Co and Ni are homogeneously distributed over the particle diameter of the respective electrode active materials.

2. The electrode active material according to claim 1, having an average secondary particle diameter (D50) in the range of from 5 to 20 μm.

3. The electrode active material according claim 1, wherein a volume of the crystallographic unit cell of partially delithiated material according to formula (II)

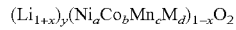 (II)

is at most 1 percent smaller than a volume of the crystallographic unit cell of the respective fully lithiated material, with y fulfilling the condition that y·(1+x) is in the range of from 0.35 to 1.

4. An electrode comprising a current collector and
(A) at least one electrode active material according to claim 1,
(B) carbon in electrically conductive form,
(C) a binder, and
(D) optionally, a solid electrolyte.

5. The electrode according to claim 4, comprising:
(A) 50 to 100% by weight of the electrode active material according to claim 1;
(B) 0 to 5% by weight of carbon in electrically conductive form;
(C) 0 to 5% by weight of the binder; and,
(D) optionally, a solid electrolyte,
the weight percentages referring to the sum of (A)+(B)+(C)+(D).

6. A process for making an electrode active material according to claim 1, the process comprising:
(a) manufacturing a particulate precursor by co-precipitation of hydroxides or carbonates of Ni, Co and, optionally, Mn and, optionally, M;
(b) mixing the particulate precursor with a source of lithium to obtain a mixture; and
(C) calcining the mixture obtained in (b).

* * * * *